(12) United States Patent
Broughman

(10) Patent No.: US 9,149,954 B2
(45) Date of Patent: *Oct. 6, 2015

(54) SOLID FACE DIE PLATE

(71) Applicant: GALA INDUSTRIES, INC., Eagle Rock, VA (US)

(72) Inventor: Matthew D. Broughman, Troutville, VA (US)

(73) Assignee: GALA INDUSTRIES, INC., Eagle Rock, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,376

(22) Filed: Aug. 5, 2013

(65) Prior Publication Data

US 2014/0065253 A1 Mar. 6, 2014

Related U.S. Application Data

(63) Continuation of application No. 11/798,490, filed on May 14, 2007, now Pat. No. 8,512,021.

(60) Provisional application No. 60/800,030, filed on May 15, 2006.

(51) Int. Cl.
*B29B 9/06* (2006.01)

(52) U.S. Cl.
CPC .. *B29B 9/065* (2013.01); *B29B 9/06* (2013.01)

(58) Field of Classification Search
CPC .................................. B29B 9/06; B29B 9/065
USPC ...................... 425/67, 192 S, 313, 382.2, 464
See application file for complete search history.

(56) References Cited

U.S. PATENT DOCUMENTS

| 2,850,764 | A | * | 9/1958 | Evans et al. | 264/143 |
|-----------|---|---|--------|-------------|---------|
| 3,271,821 | A | * | 9/1966 | Street | 425/313 |
| 3,308,507 | A | * | 3/1967 | Black | 425/311 |
| 3,343,123 | A | | 9/1967 | Troesch | |
| 3,343,213 | A | * | 9/1967 | Fritsch | 425/313 |
| 4,378,964 | A | | 4/1983 | Wolfe, Jr. | |
| 4,564,350 | A | | 1/1986 | Holmes et al. | |
| 4,830,598 | A | | 5/1989 | Inoue et al. | |
| 5,624,688 | A | | 4/1997 | Adams et al. | |
| 5,679,380 | A | * | 10/1997 | Munz et al. | 425/67 |
| 6,824,371 | B2 | | 11/2004 | Smit | |
| 8,512,021 | B2 | * | 8/2013 | Broughman | 425/67 |
| 2005/0035483 | A1 | | 2/2005 | Jackson et al. | |

FOREIGN PATENT DOCUMENTS

| DE | 20005026 | 8/2000 |
| EP | 0151390 | 8/1985 |

* cited by examiner

*Primary Examiner* — Yogendra Gupta
*Assistant Examiner* — Joseph Leyson
(74) *Attorney, Agent, or Firm* — Jacobson Holman, PLLC

(57) ABSTRACT

A solid face die plate for an underwater pelletizer includes a carrier or holding plate having a circular slot for holding a hard anti-wear element of highly wear-resistant material through which the extrusion orifices open for extruding polymer. The solid face die plate eliminates the need for insulation or plugging material in the center of the die plate and, by embedding the hard anti-wear element within the carrier, protects the edges of the hard anti-wear element for longer wear life.

17 Claims, 6 Drawing Sheets

SOLID FACE DIE PLATE

This is a continuation of application Ser. No. 11/798,490 filed May 14, 2007, issuing as U.S. Pat. No. 8,512,021 on Aug. 20, 2013, which claimed benefit of U.S. provisional application No. 60/800,030 filed May 15, 2006, and hereby claims the foregoing priority to which it is entitled.

BACKGROUND OF THE INVENTION

1. Field of the Invention

The present invention is related to the field of underwater pelletizers and, more particularly, to a solid face extrusion die plate for an underwater pelletizer.

2. Description of the Related Art

Known underwater pelletizers include an extrusion die or die plate having extrusion orifices extending therethrough and through which molten polymer is extruded. A cutter hub with cutter knives is oriented in rotatable facing relationship to the face of the extrusion die plate to cut the strands of polymer into pellets. A water box with a water inlet and outlet provides circulation of water to cool and solidify the strands of extruded polymer to enable the knives on the cutter hub to cut the strands into pellets. The water circulating through the water box also entrains the pellets into a slurry of water and pellets which are discharged through the outlet of the water box.

A known practice is to provide a recess in the die face of the extrusion die plate and place insulation material in the recess to reduce heat transfer from the extrusion die plate and molten polymer being extruded through the extrusion orifices to the water circulating through the water box. The insulation material inserted into the recess is typically a gasket material mounted in place by a suitable mastic, glue or the like and covered with a thin metal plate in the recess. The thin plate is secured to the die plate by suitable fasteners to maintain the insulation material in place in the recess. The insulation material is subjected to substantial degradation due to the temperatures encountered in the recess and, in some instances, does not effectively insulate the central recess area of the die face. Ineffective insulation can result in excessive cooling of the molten polymer as it is being extruded through the extrusion orifices causing freeze off of the molten polymer at the die face.

One solution to these problems is to provide an insulation plug in the form of a circular plate that substantially fills the recess in the die face, as set forth in U.S. Pat. No. 6,824,371, the entire disclosure of which is hereby expressly incorporated by reference in its entirety as though fully set forth herein. The circular plate of the '371 patent, referred to herein as a gasket eliminator plug (GEP), reduces the transfer of heat from the molten polymer being extruded through the orifices in the extrusion die plate to the water circulating through the water box of the underwater pelletizer, and further is not subject to deterioration and degradation as encountered with conventional insulation techniques.

The tolerance between the GEP of the '371 patent, or conventional insulation materials, and the die face is very small. Hence, it is easy to damage the die face when installing or removing the GEP during routine maintenance. This is a problem in that the GEP is relatively expensive to manufacture and yet, to work correctly, must have a tight fit within the die plate.

SUMMARY OF THE INVENTION

In order to overcome the known problems associated with the insulation techniques of the prior art, the present invention provides a solid face die plate for an underwater pelletizer. The solid face die plate includes a die plate base member and a removable die insert body. The die insert body has a solid face plate on its cutting face side which is made up of a carrier or holding plate with a hard anti-wear element (or elements) surrounding the extrusion die holes. The carrier is made of one piece of material and has a generally circular slot for holding the hard anti-wear element. Once fitted within the slot, the hard anti-wear element is held, supported and protected by the carrier.

The solid face die plate is affixed to the die insert body so as to be in contact with cutter knives and the water flowing through the cutting chamber. Because it is solid, the die plate prevents water flowing through the cutting chamber from leaking behind the die plate and also ensures that molten polymer behind the die plate cannot leak into the cutting chamber.

It is, therefore, an object of the present invention to provide a solid face die plate for an underwater pelletizer in which the hard anti-wear element of the die plate is held, supported and protected by a carrier having a unitary construction.

Another object of the present invention is to provide a solid face die plate that eliminates the need for a gasket eliminator plug or insulating materials that are otherwise necessary with conventional die plate designs having an open center. This solid face design also avoids the need for insulation holes and nose cone bolt holes.

A further object of the present invention is to provide a solid face die plate with no insulation changing requirements or other maintenance needs associated with the center of the die.

Still another object of the present invention is to provide a unitary carrier that protects the hard anti-wear element of the die plate, especially the edges, with the hard anti-wear element fitting flush within the carrier.

A still further object of the present invention is to provide a solid face die plate that enables quicker die changes to be made between products being pelletized.

Yet another object of the present invention is to provide a solid face plate that can be permanently or removably attached to the die insert body, with removable attachment allowing the same die insert body to be assembled with multiple solid face die plates. Removable attachment also results in cost and time savings as only the solid face die plate needs to be replaced instead of the entire die insert body.

A still further object of the present invention is to provide a solid face die plate which reduces heat transfer from the molten polymer and the housing of an underwater pelletizer to water circulating through the water box associated with the cutter hub, cutter knives and die face.

Yet another object of the present invention is to provide a solid face die plate for an underwater pelletizer which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
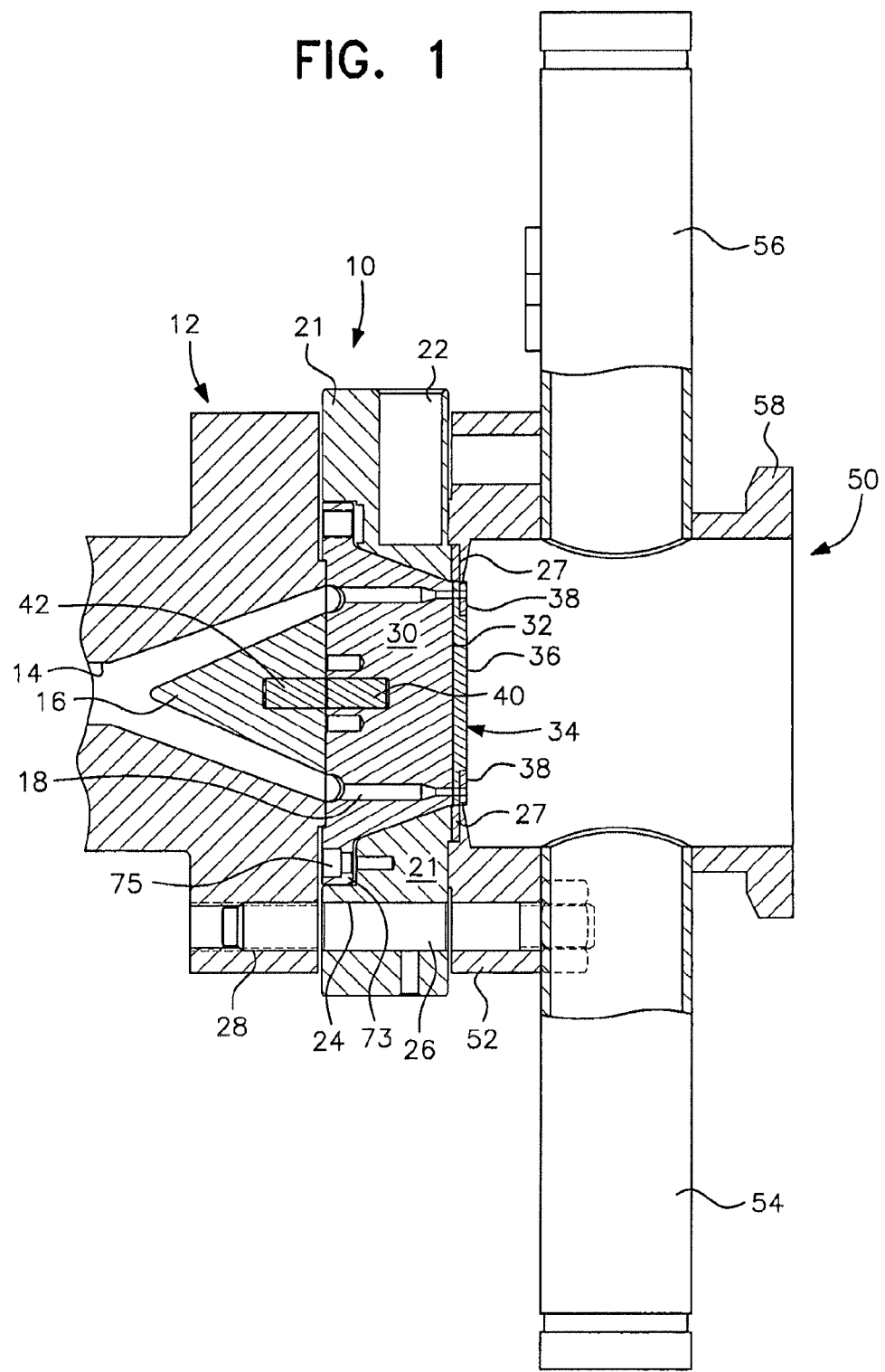
FIG. 1 is a partial sectional view of an underwater pelletizer illustrating a solid face plate mounted on a die insert body in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

FIG. 1 of the drawings illustrates an underwater pelletizer including a solid face die plate in accordance with the present invention, generally designated by reference numeral 10, mounted on a housing, generally designated by reference numeral 12, of an extruder. The housing 12 includes an inlet passageway 14 receiving molten polymer from upstream equipment. The molten polymer is diverted outwardly by a nose cone 16 and passes through a plurality of extrusion orifices 18 in the die plate 10. The die plate 10 preferably has radial heating elements 22 extending inwardly from the periphery thereof and a plurality of apertures 24 receiving bolts 26 which are threaded into threaded apertures 28 in housing 12.

The solid face die plate 10 may be unitary in construction or, as shown in FIG. 1, may preferably include a die plate base member 21 and a removable die insert body 30 fitted therein. In either case, the solid face die plate 10 has an attaching surface 32 on its downstream side. Mounted on the attaching surface 32 is a solid face plate, generally designated by reference numeral 34, that includes a carrier 36 and a hard anti-wear element 38. The solid face die plate 10 also includes a bore 40 to accommodate a fastening element 42 used to hold the nose cone 16 in place on the die plate 10. In the embodiment shown in FIG. 1, the bore 40 is in the die insert body 30 portion of the solid face die plate 10.

A water box, generally designated by reference numeral 50, in the form of a hollow housing includes a flange 52 secured to the die plate 10 and housing 12 by the bolts 26. A seal gasket 27 ensures a watertight seal between the die plate 10 and carrier 36 and the water box 50.

The water box 50 includes a water inlet 54, a water and pellet slurry outlet 56 and a flange 58 associated with a similar flange on a drive unit (not shown). Water circulating through the water box cools and solidifies the polymer and entrains the pellets into a water and pellet slurry for discharge through outlet 56. Other standard components associated with the water box and pelletizer such as the drive shaft, cutter hub and cutter knives for cutting polymer strands extruded through the orifices 18 into pellets are not shown but are of conventional design and function in a well known manner to extrude molten polymer through extrusion holes or orifices 18 in the solid face die plate 10 as would be known by persons of ordinary skill in the art.

Figure 2:
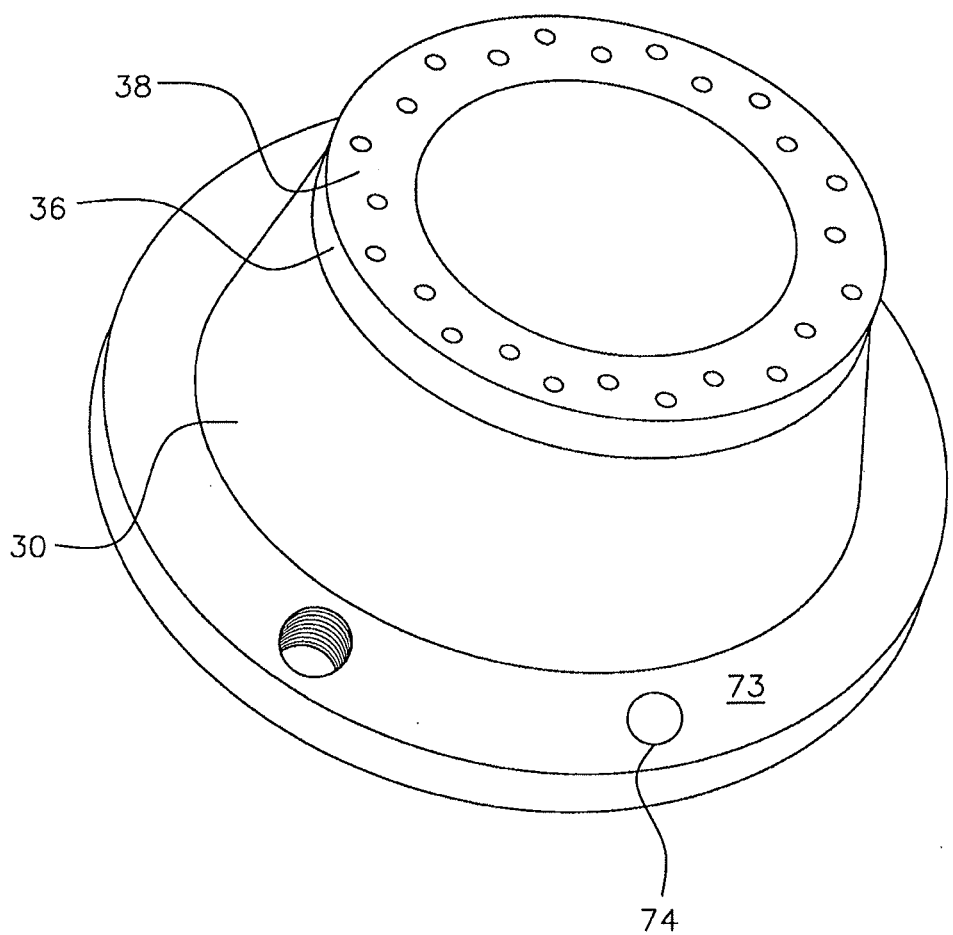
FIG. 2 is a perspective view of the die insert body and solid face plate of FIG. 1.
Figure 5:
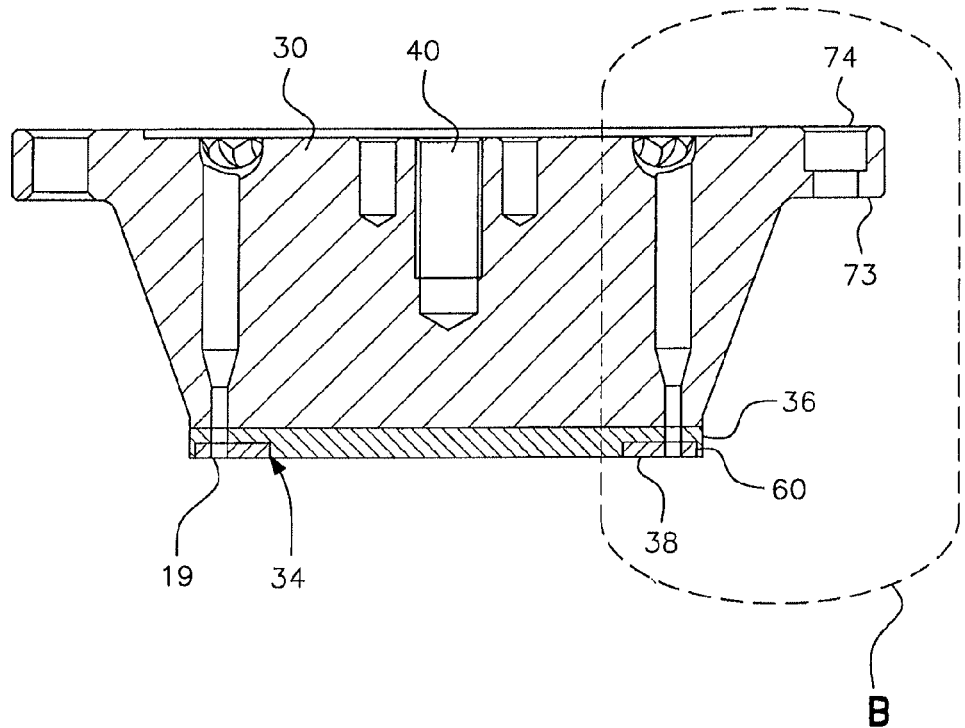
FIG. 5 is a sectional view taken along line A-A of FIG. 4.
Figure 6:
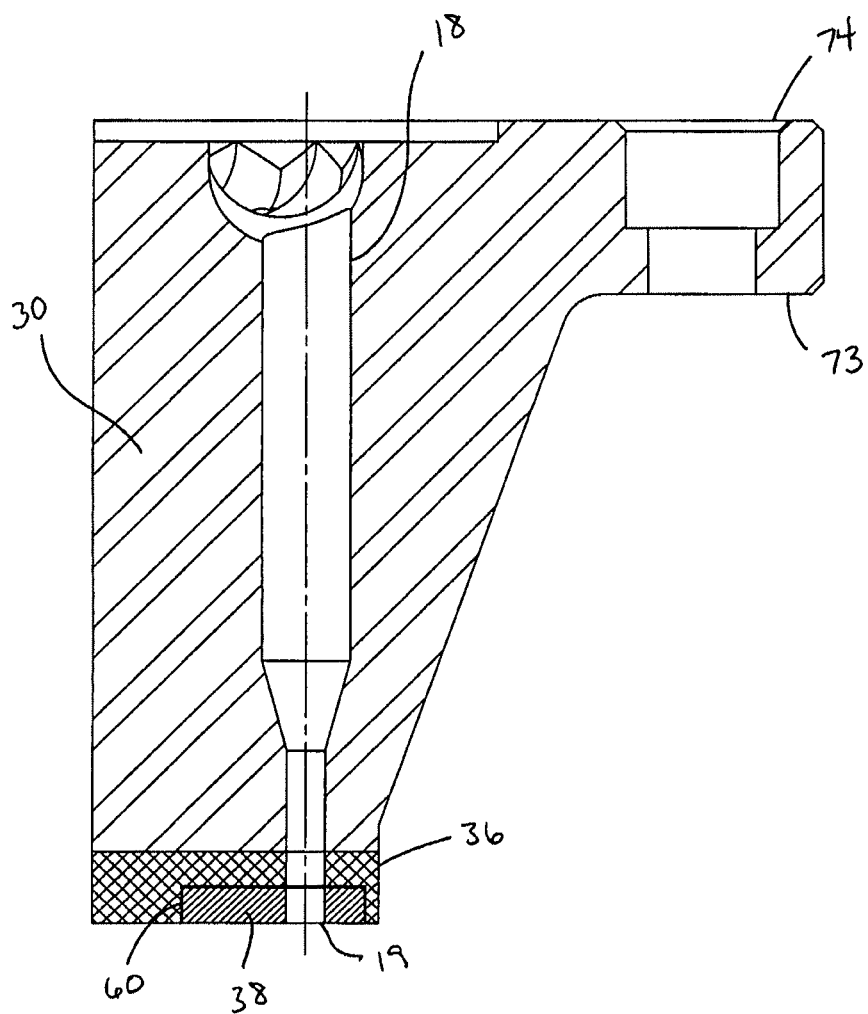
FIG. 6 is an enlarged view of detail B of FIG. 5.

As shown in FIG. 2, the solid face plate 34, including the hard anti-wear element 38 fitted within the carrier 36, sits flush with the die insert body 30 and may be attached thereto by welding, brazing or other comparable technique. The embedded position of the hard anti-wear element 38 within the carrier 36 protects the edges 60 (see FIGS. 5 and 6) of the hard anti-wear element 38, preventing them from being damaged. The one-piece construction of the carrier 36 also eliminates the need for an insulation plate, or GEP such as that described in the '371 patent. Given the cost of manufacturing a GEP, this results in cost savings to the user.

The die insert body 30 is typically made of carbon steel while the hard anti-wear element 38 is made of a high-wear-resistant material such as tungsten carbide. In a preferred construction, the carrier 36 is made of a nickel-iron alloy such as HASTELLOY C-276 alloy or INVAR 36 alloy. As shown in FIG. 2, the hard anti-wear element 38 may be formed as a solid tungsten carbide ring or, alternatively, may be composed of a plurality of tungsten carbide tiles as is known in the art. Generally, smaller dies are made with a solid face ring while tiles are used in the construction of larger die plates.

Figure 3:
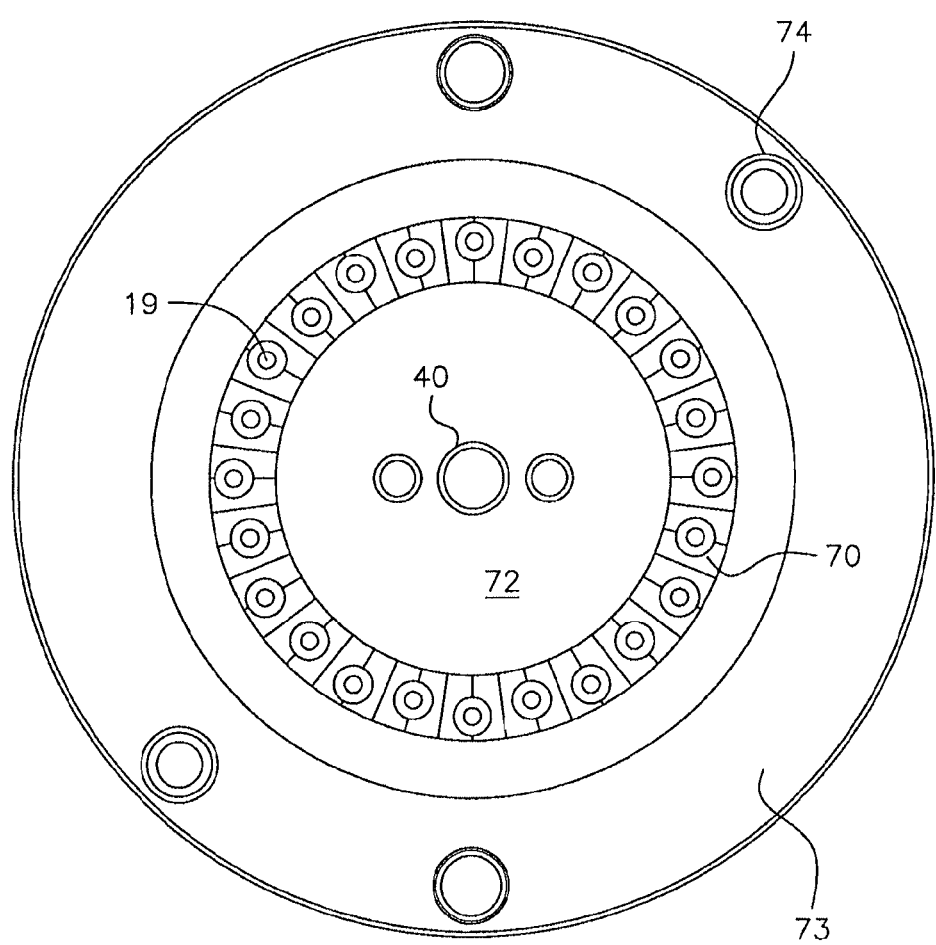
FIG. 3 is a rear view of the die insert body and solid face plate of FIG. 2.

As shown in the rear view of FIG. 3, machined ramps 70 formed in the die insert body 30 funnel the extrusion material to the attaching surface 32 and into the upstream side of the solid face plate 34. The bore 40 is drilled and tapped in the solid center plate 72 for connection of the nose cone 16 to the die plate 10. The die insert body 30 has a flange 73 provided with holes 74 for fastening of the die insert body 30 to the die plate base member 21 with fastening elements 75.

Figure 4:
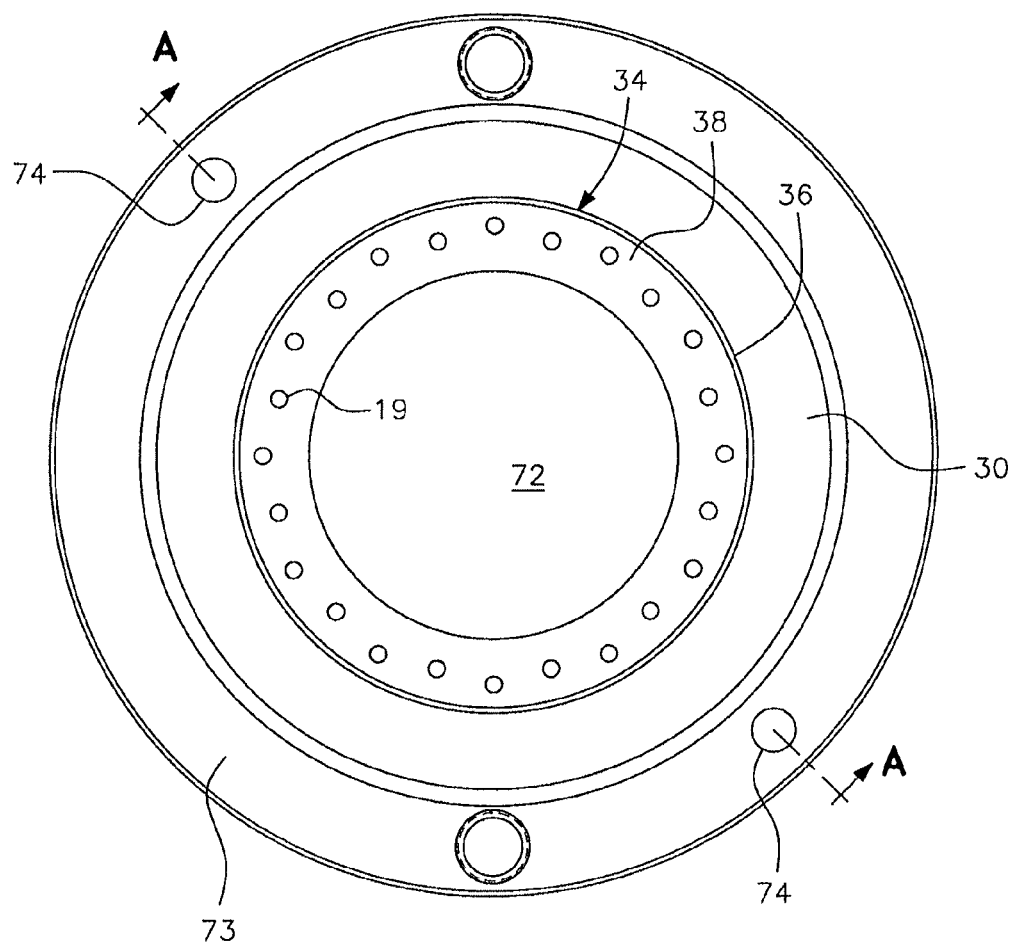
FIG. 4 is a front view of the die insert body and solid face plate of FIG. 2.

A front view of the solid face plate 34 as coupled to the die insert body 30, with the exit openings 19 of the plurality of extrusion orifices 18, is shown in FIG. 4. Sectional views of the die insert body 30 with solid face plate 34 are provided in FIGS. 5 and 6.

In addition to being brazed onto the die insert body 30, the solid face plate 34 according to the present invention may also be bolted in position. In this embodiment, fastening elements such as socket head cap screws are fitted into counter-bored holes provided in the inner surface of the hard anti-wear element (not shown). With this construction, the solid face plate 34 is interchangeable and can be replaced separately from the die insert body 30, resulting in cost savings to the user. The user can also use the same die insert body with multiple carriers which provides a benefit for maintenance purposes between product changes.

With the solid face plate 34 according to the present invention, the need for an insulation plate or GEP is eliminated. This results in the elimination of three drill and tap holes, as well as the associated bolts which can become eroded and broken. There is also no need for RTV insulation sealer. Hence, maintenance time is reduced and safety of the operator is improved.

The solid face plate 34 may further be provided with a wear limit indicator hole that indicates wear life remaining on the hard anti-wear element. This hole can be machined into the carrier so as to be exposed when grinding the die plate to its maximum.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What I claim is:

1. A solid face die plate for extruding polymer in an underwater pelletizer comprising:

a solid face die plate having a die plate body with a generally circular, solid downstream face and a generally circular solid face plate affixed to an attaching surface on the solid downstream face of said die plate body and extending fully across said solid downstream face, said solid face plate including a carrier and a hard anti-wear element embedded within said carrier, said anti-wear element being made of tungsten carbide and said carrier being made of a nickel-iron alloy.

2. The solid face die plate as set forth in claim 1, wherein said die plate body includes a die plate base member and a removable die insert body fitted therein, said solid face plate being assembled to said die insert body.

3. The solid face die plate as set forth in claim 2, wherein said solid face plate is flush with said die insert body.

4. The solid face die plate as set forth in claim 1, wherein said carrier has a one-piece construction that eliminates need for an insulation plate or plug.

5. The solid face die plate as set forth in claim 1, wherein said carrier is removably assembled to the attaching surface by fastening elements.

6. The solid face die plate as set forth in claim 1, wherein said hard anti-wear element as embedded in said carrier is flush therewith such that edges of said hard anti-wear element are protected from wear by said carrier.

7. The solid face die plate as set forth in claim 1, wherein said solid face plate includes exit openings for said extrusion orifices spaced around a perimeter of said solid face plate with a central area encircled by said exit openings being solid.

8. The solid face die plate as set forth in claim 1, wherein said solid face die plate body is unitary in construction.

9. An underwater pelletizer assembly comprising:
an underwater pelletizer having a housing, a rotatable shaft supported in the housing, a drive mechanism for driving the shaft and a cutter blade assembly on one end of the shaft for association with an extrusion die plate for cutting extruded polymer into pellets at a downstream side of said housing; and
a solid face die plate for extruding polymer in said underwater pelletizer, said solid face die plate having a die plate body with a generally circular, solid downstream face and a generally circular solid face plate affixed to the solid downstream face of said die plate body and extending fully across said solid downstream face, said solid face plate including a carrier made of a nickel-iron alloy and a hard anti-wear element made of tungsten carbide, said hard anti-wear element being embedded within said carrier such that edges of said hard anti-wear element are protected from wear.

10. The underwater pelletizer assembly as set forth in claim 9, wherein said solid face plate further includes a wear limit indicator for indicating wear life remaining on said hard anti-wear element.

11. The underwater pelletizer assembly as set forth in claim 9, wherein said die plate body includes a die plate base member and a removable die insert body fitted therein, said solid face plate being assembled to said die insert body.

12. The underwater pelletizer assembly as set forth in claim 9, wherein said die plate body is unitary in construction.

13. The underwater pelletizer assembly as set forth in claim 9, wherein said carrier is adhered to the solid downstream face of said die plate body by welding or brazing.

14. The underwater pelletizer assembly as set forth in claim 9, wherein said carrier is removably assembled to the solid downstream face of said die plate body by fastening elements.

15. A solid face die plate for extruding polymer in an underwater pelletizer comprising a solid face die plate having a die plate body with a generally circular, solid downstream face and a generally circular solid face plate affixed to the solid downstream face of said die plate body and extending fully across said solid downstream face, said solid face plate including a carrier and a hard anti-wear element associated with said carrier, said solid face plate further including a wear limit indicator for indicating wear life remaining on said hard anti-wear element.

16. The solid face die plate as set forth in claim 15, wherein said die plate body includes a die plate base member and a removable die insert body fitted therein, said solid face plate being assembled to said die insert body.

17. The solid face die plate as set forth in claim 15, wherein said die plate body is unitary in construction.

* * * * *